US010814835B2

(12) United States Patent
Chengalvala et al.

(10) Patent No.: US 10,814,835 B2
(45) Date of Patent: Oct. 27, 2020

(54) METHOD AND APPARATUS FOR VEHICLE ASSISTED DYNAMIC MULTI-FACTOR AUTHENTICATION

(71) Applicant: FORD GLOBAL TECHNOLOGIES, LLC, Dearborn, MI (US)

(72) Inventors: Venkata Maruthe Ravikumara Sharma Chengalvala, Troy, MI (US); James Wilhelm Heaton, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/288,521

(22) Filed: Feb. 28, 2019

(65) Prior Publication Data

US 2020/0276960 A1    Sep. 3, 2020

(51) Int. Cl.
*B60R 25/25* (2013.01)

(52) U.S. Cl.
CPC ............ *B60R 25/25* (2013.01); *B60R 25/257* (2013.01)

(58) Field of Classification Search
CPC ...... G07C 9/37; G07C 9/257; G07C 9/00563; G07C 9/25; G07C 9/00571; G07C 9/27; G07C 9/28; G07C 9/32; G07C 9/26; G07C 9/33; G07C 9/38; G07C 9/00896; G07C 9/22; G07C 2209/04; B60R 25/24; B60R 25/241; B60R 25/243; B60R 25/245; B60R 25/246; B60R 25/248; B60R 25/25; B60R 25/252; B60R 25/255; B60R 25/257; B60R 2325/205; B60W 2040/0809; B60W 2540/043; B60W 2540/045; B60W 2540/047
USPC ................................................ 340/5.52, 5.27
See application file for complete search history.

(56) References Cited

U.S. PATENT DOCUMENTS

| 8,725,330 | B2* | 5/2014 | Failing | B60L 3/00 701/22 |
| 8,989,954 | B1* | 3/2015 | Addepalli | H04W 72/0406 701/32.3 |
| 9,020,697 | B2* | 4/2015 | Ricci | B60W 50/085 701/36 |
| 9,586,559 | B2* | 3/2017 | Keating | H04M 1/72563 |
| 9,691,204 | B2* | 6/2017 | Frykman | G07C 9/33 |
| 9,774,597 | B2* | 9/2017 | Speicher | H04L 63/0861 |
| 9,936,064 | B2 | 4/2018 | Silver et al. | |
| 9,971,348 | B1 | 5/2018 | Canavor et al. | |
| 10,074,223 | B2* | 9/2018 | Newman | G07C 9/28 |
| 10,078,748 | B2* | 9/2018 | Mehta | H04L 9/3226 |
| 10,200,371 | B2* | 2/2019 | Darnell | H04L 9/0866 |
| 10,249,123 | B2* | 4/2019 | Hatton | G07C 9/00857 |

(Continued)

*Primary Examiner* — Edwin C Holloway, III
(74) *Attorney, Agent, or Firm* — Michael Spenner; Brooks Kushman P.C.

(57) ABSTRACT

A system includes a processor that receives an authentication request, at a vehicle, from an application executing on a device in communication with the vehicle, including a security designation. The receiving vehicle then determines if the vehicle has access to a primary security authentication system corresponding to the security designation. The vehicle also, responsive to the vehicle having access, utilizes the primary authentication system to authenticate a user via the determined primary security authentication system and provide user credentials, obtained based on successful use of the primary authentication system, to the device.

20 Claims, 4 Drawing Sheets

(56) References Cited

U.S. PATENT DOCUMENTS

| | | | |
|---|---|---|---|
| 10,358,116 B1* | 7/2019 | Jayaraman | H04L 63/1416 |
| 10,464,529 B1* | 11/2019 | Zhang | G07C 9/00896 |
| 10,501,055 B1* | 12/2019 | Yi | H04L 9/0891 |
| 2004/0257196 A1* | 12/2004 | Kotzin | G06F 21/32 |
| | | | 340/5.52 |
| 2012/0226413 A1 | 9/2012 | Chen et al. | |
| 2019/0031145 A1* | 1/2019 | Trelin | B66B 1/3407 |
| 2020/0050749 A1* | 2/2020 | Barboi | G06F 21/32 |

* cited by examiner

METHOD AND APPARATUS FOR VEHICLE ASSISTED DYNAMIC MULTI-FACTOR AUTHENTICATION

The illustrative embodiments generally relate to methods and apparatuses for vehicle assisted dynamic multi-factor authentication.

BACKGROUND

With digital access systems and remote communication capability, vehicle systems are becoming increasingly more accessible without reliance on a physical key or a directly connected device. This provides for a variety of types of useful access, but also exposes the vehicle to a variety of increased attempts to circumvent security.

In most pre-2000 vehicles, a physical key was required to access and/or start the vehicle ignition. Even when a physical key was not required, the vehicle typically required the user to possess a fob, which wirelessly authenticated itself to the vehicle, essentially confirming that the user was in possession of a device designated to access and start the vehicle.

Moreover, access to onboard vehicle data was largely limited to physical vehicle interfaces, primarily the onboard data bus (ODB) port. Even if ODB access was not protected via a security measure per se, the fact that a user had to be inside the vehicle and physically connecting to the vehicle via the ODB port provided assurances that these accesses, at least typically, were being done under permissible circumstances.

SUMMARY

In a first illustrative embodiment, a system includes a processor configured to receive an authentication request, at a vehicle, from an application executing on a device in communication with the vehicle, including a security designation. The processor is also configured to determine if the vehicle has access to a primary security authentication system corresponding to the security designation. The processor is further configured to, responsive to the vehicle having access, utilize the primary authentication system to authenticate a user via the determined primary security authentication system and provide user credentials, obtained based on successful use of the primary authentication system, to the device.

In a second illustrative embodiment, a method includes receiving an authentication request at a vehicle, including a security designation, from an application in communication with the vehicle. The method also includes determining a primary authentication system, accessible to the vehicle, meeting the security designation. The method further includes responsive to determining the primary authentication system, using the primary authentication system to authenticate a user and providing credentials to the application, responsive to successful authentication via the vehicle-accessible authentication system.

In a third illustrative embodiment, a method includes, responsive to a vehicle determining that the vehicle lacks access to a primary authentication system specified in an authentication request received from an application executing on a device in communication with a vehicle computer, determining a plurality of available secondary security authentication systems that are predefined as collectively representing a predefined security level corresponding to the security designation when successfully utilized to authenticate the user in conjunction with each other, based on a predefined aggregation model defining a plurality of authentication system aggregation options and corresponding security levels for each aggregation. The method also includes utilizing the determined plurality of available secondary authentication systems to fulfil the authentication request.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
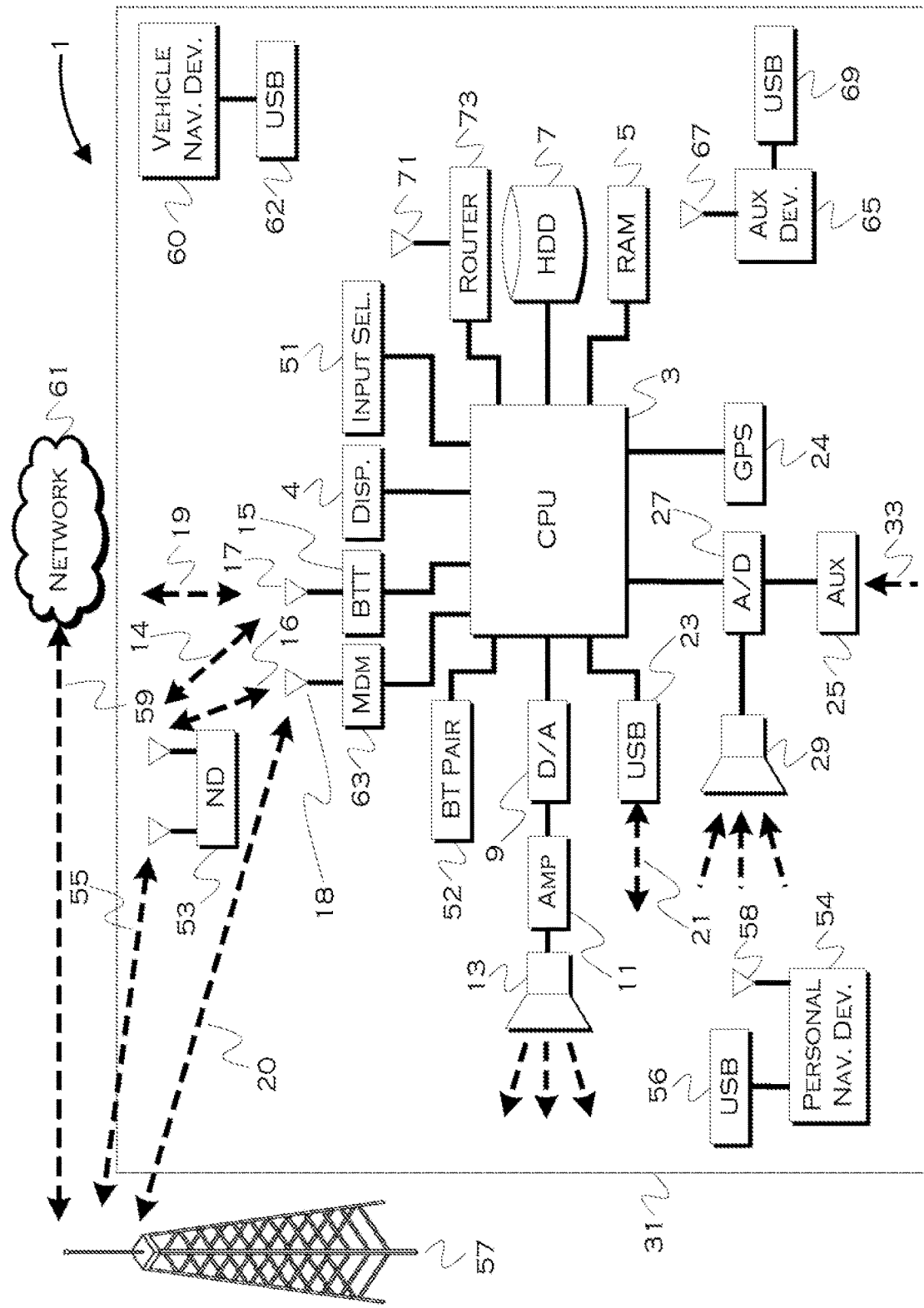
FIG. 1 shows an illustrative vehicle computing system.

FIG. 1 illustrates an example block topology for a vehicle based computing system 1 (VCS) for a vehicle 31. A vehicle provided with a vehicle-based computing system may contain a visual front-end interface 4 located in the vehicle. The user may also be able to interact with the interface if it is provided, for example, with a touch-sensitive screen. In another illustrative embodiment, the interaction occurs through, for example, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor 3 allows for onboard processing of commands and routines. Further, the processor 3 is connected to both non-persistent 5 and persistent storage 7. In this illustrative embodiment, the non-persistent storage 7 is random access memory (RAM) and the persistent storage 5 is a hard disk drive (HDD) or flash memory. In general, persistent memory 5 can include all forms of memory that maintain data when a computer or other device is powered down. These include, but are not limited to, HDDs, compact discs (CDs), digital video discs (DVDs), magnetic tapes, solid state drives, portable universal serial bus (USB) drives and any other suitable form of persistent memory.

The processor 3 is also connected to a number of different inputs allowing the user to interface with the processor 3. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 5 is also provided, to allow a user to swap between various inputs. Input to both the microphone 29 and the auxiliary connector 33 is converted from analog to digital by a converter 27 before being passed to the processor. Although not shown, numerous of the vehicle components and auxiliary components in communication with the processor 3 may use a vehicle network (such as, but not limited to, a CAN bus) to pass data to and from the processor 3 (or components connected thereto).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system uses the BLUETOOTH transceiver 15 to communicate via antenna 17 with a user's nomadic device (ND) 53 (e.g., cell phone, smart phone, PDA, or any other device having wireless remote network connectivity). The nomadic device 53 can then be used to communicate signal 59 with a network 61 outside the vehicle 31 through, for example, communication 55 with a cellular tower 57 or Wi-Fi access point.

Exemplary communication between the nomadic device 53 and the BLUETOOTH transceiver 15 is represented by signal 14.

Pairing of a nomadic device 53 with the BLUETOOTH transceiver 15 can be instructed through a button 52 or similar input. Accordingly, the processor 3 is instructed that the onboard BLUETOOTH transceiver 15 will be paired with a nomadic device.

Data may be communicated between processor 3 and network 61 utilizing, for example, a data-plan, data over voice, or DTMF tones associated with nomadic device 53. Alternatively, it may be desirable to include an onboard modem 63 having antenna 18 in order to cellularly communicate 16 data between processor 3 and network 61.

In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor 3 is provided with an operating system including an application programming interface (API) to communicate with modem application software. The modem application software may access an embedded module or firmware on the BLUETOOTH transceiver 15 to complete wireless communication 14 with a remote BLUETOOTH transceiver (such as that found in a nomadic device 53). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication format that can be used in this realm is free-space optical communication non-standardized consumer IR protocols.

In another embodiment, nomadic device 53 includes a modem for voice band or broadband data communication. In a data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In still another embodiment, nomadic device 53 is replaced with a cellular communication device (not shown) that is installed in vehicle 31. In yet another embodiment, the nomadic device 53 may be a wireless local area network (LAN) device capable of communication over, for example (and without limitation), a Wi-Fi network.

In one embodiment, incoming data can be passed through the nomadic device 53 via a data-over-voice or data-plan, through the onboard BLUETOOTH transceiver 15 and into the vehicle's internal processor 3. In the case of certain temporary data, for example, the data can be stored on the HDD 7 or other storage media until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the processor 3 could be in communication with a variety of other auxiliary devices 65. These devices can be connected through a wireless 67 or wired 69 connection (e.g. USB). Auxiliary devices 65 may include, but are not limited to, personal media players, wireless health devices, portable computers, and the like.

Also, or alternatively, the processor 3 could be connected to a vehicle based wireless router 73, using for example a Wi-Fi (IEEE 802.11) 71 transceiver. This could allow the processor 3 to connect to remote networks in range of the local router 73.

While older vehicles often required physical access (a fob, a key, a plugged-in device) to interface with, or use the vehicles, modem vehicles 31 are capable of wireless communication to assist in access models. In the wake of these changes, the vehicles 31 may now need to authenticate multiple devices for wireless access, and there is an opportunity to leverage aspects of those devices (e.g., a fingerprint reader or a keypad) to provide increased security.

A shortcoming of most modem access systems, however, is that they still treat all of the various authentication methods as binary. That is, if a user can authenticate via one designated method or another, that is sufficient for a given authentication process. Different processes may request different types of authentication, but again, these requests may be binary in nature, which is to say that they either function if the requested authentication type is present or fail if the requested authentication type is not present. A certain type or set of authentication types may be requested on the basis that those types are of a high enough security for a given process. These paradigms do not leverage the variances in authentication capability, for example, a fingerprint scan is a near guarantee that a specific user is present, whereas a numeric code could be input by anyone who had obtained access to the code.

Moreover, some authentication is active (fingerprint, code), whereas other authentication is passive (based on device presence, for example). The illustrative embodiments provide opportunities to improve security of digital systems by defining levels of security associated with varied available security options and allowing applications and processes to require certain security assurances are met based on, for example, criticality of security. By allowing the vehicle 31 to recognize the presence and types of available options and determine if the security credentialing was suitable, the application and/or process does not actually need to know whether or not a particular security measure was met, just that certain assurances were met based on a level of security designated by the application or process.

For example, a checking account program may have a high security associated therewith, because a user only wants access to be granted to specific people. A fingerprint is a good method of securing such access, but many devices and/or vehicles lack fingerprint identification capability. In the absence of the best option (e.g., a fingerprint), a combination of a certain device being used in conjunction with a code being used may be sufficient. Put another way, in this example, two mediumly secure factors (device presence and code) equal one high security factor. Under such a model, the checking account application could specify "high security," and let a vehicle 31 decide whether that requirement is met by either a vehicle-defined high security option (as predefined by a manufacturer) or by multiple vehicle-defined medium security options. The application can remain agnostic as to the particulars of authentication, as long as the vehicle 31 verifies that minimum standards were satisfied in accordance with a common manufacturer set of designated security levels for various available authentication options.

In other cases, the requesting application or process may require specific protocols (e.g., "fingerprint only"), but may lack capability to determine if anything other than a device on which the application resides includes such capability. In those instances, the vehicle 31 can detect additional authentication options, and can also even send a list of those options to an application provider (e.g., support server), in case the provider wants to decide on suitability of a secondary authentication option, but does not want to leave it up to the vehicle manufacturer to decide what that should be. So, using the preceding example, the checking account process would specify "fingerprint only," as an access constraint, and then the vehicle 31 could identify the fact that the vehicle includes an onboard fingerprint reader, the input of which could be provided to the application. Alternatively, the vehicle 31 could inform an application support server or the application that the vehicle 31 can verify an occupant through facial recognition, and the application or server could confirm that this is sufficient to verify access in the absence of a fingerprint scanner.

Or, in another example, the vehicle could alternatively indicate to the checking application provider that the vehicle 31 has identified a detected device and user-input code as authenticating the user, and leave it up to the checking application provider to decide if this was sufficient (at which point the provider could authenticate an access request based on the indicated verification that was present and detectable).

Again, this allows the coding of the application to remain relatively agnostic to changing security options, instead simply having to work within a paradigm of definite security levels and appreciating what impact a chosen level has on a consumer (i.e., setting an application as "high security" may prevent access under certain conditions, if specified security constraints are lacking and a suitable alternative combination of lower security factors is not possible or accepted).

This further allows certain applications to specify, for example, "best available," or an ordered preference of options that can be adapted to what options actually exist. In that instance, the application at least has an assurance that the presently best available (at the time of access) security provision was utilized.

Figure 2:
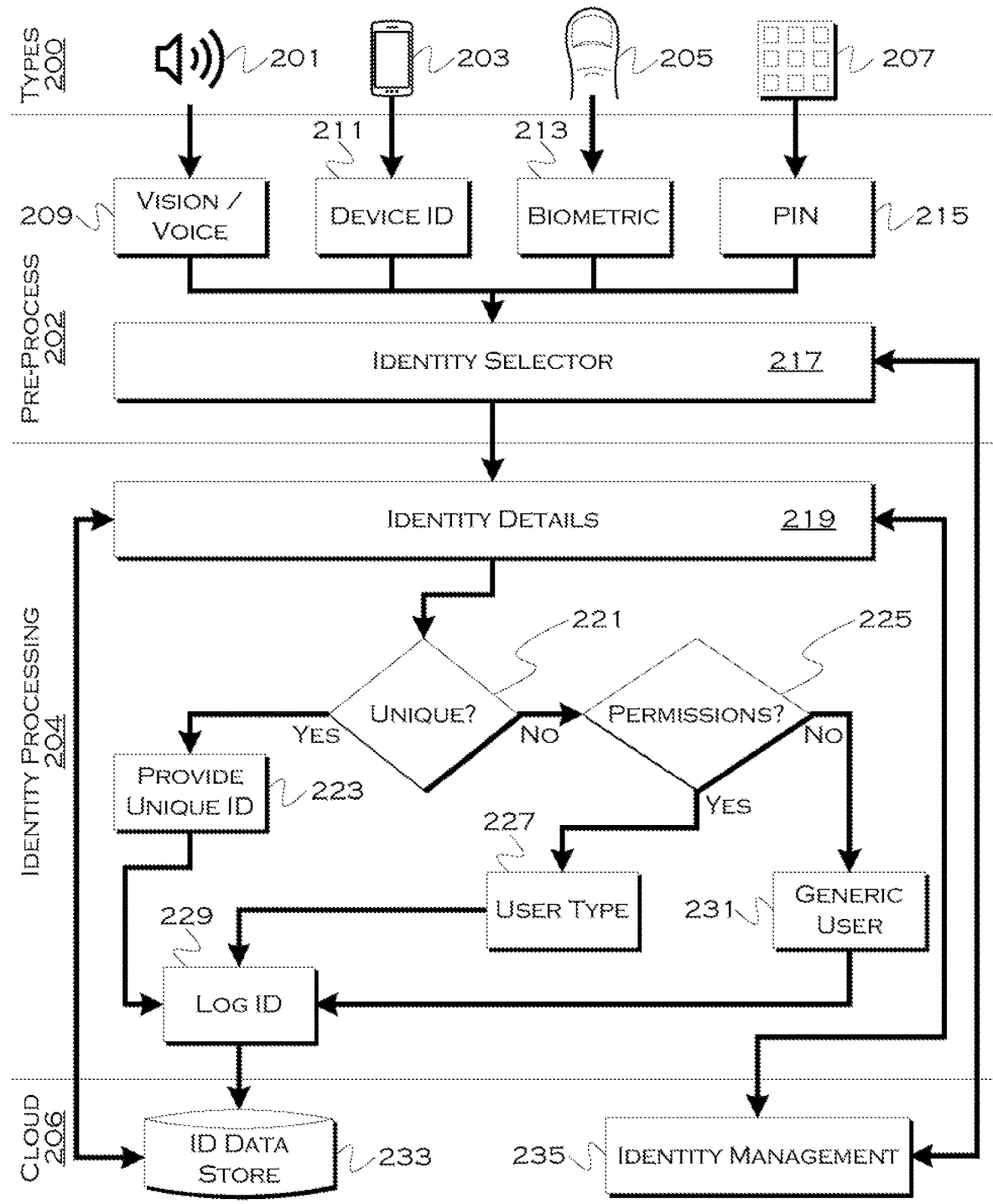
FIG. 2 shows an illustrative example of a vehicle system with multiple illustrative security protocols provided thereto.

FIG. 2 shows an illustrative example of a vehicle system with multiple illustrative security protocols 200 provided thereto. In this example, the non-limiting types of security access include a voice or vision identification 201 (enabled respectively by a microphone or a camera), a device identification (based on a device ID) 203, a biometric identification 205 (here a fingerprint scanner) and a keycode numeric input 207.

In this example, each of these systems feeds into a vehicle 31 pre-processing system 202, which includes the logic to handle, for example, voice/vision identification 209, including identification of distinct audio or visual features. In a similar manner, device preprocessing 211 may include logic for obtaining and extracting a device ID via a wireless connection or detected signal. Fingerprint preprocessing 213 may include scanning a fingerprint for key elements, and the code preprocessing 215 may simply accept the input of a particular numeric code.

Then, in this example, an identity selector process 217 can provide predefined security details for the identity types that are relevant for a given application or request. Thus, the selector 217 could provide these types based on, for example, associated level of security, such that a highly secure option (e.g., fingerprint 213) could be provided as a proxy for virtually any other request, but, for example, if the fingerprint 213 scanning capability was not present, the identity selector 217 may provide multiple alternative input mid-level security confirmations/attempts.

Using the provided input, the onboard identity processing 204 can use saved user data to confirm identity details 219. This can include both specific identification of a person (e.g., a biometric 213 or voice recognition 209) or recognition of an authorized person of a certain level (e.g., possesses a "master" device 211 and knows a code 215) or recognition of a generally authorized person (e.g., has a minimum level of security access, such as a code 215).

If the identification is usable to identify a unique user at step 221, the process can associate the specific user identity with the access request at step 223. This can also result in logging of the user authentication at step 225 as well as logging the particular application to which the access information was provided.

If the identification is not unique at step 221, the system can determine if specific permissions or a specific user level was identified at step 225. For example, if one mobile device ID is designated as a master device, and another is designated as a secondary device, the presence of a master device and a common code can be viewed as providing a higher level of access than the secondary device with the same code, or no device when the common code is input. If the system detects permission-level access identification at step 225 (i.e., there is at least one defined permission associated with a user identity or detectable characteristic), the system can assign a user type to the access request at 227, and log the types of authentication, as well as the permission level, at step 229. This type of authentication is not always as secure as the unique identification, for example, because anyone could possess the master device and code, without particular assurances that it was a specific person.

On the other hand, this type of authentication is still more secure than mere input of code, which could be overheard or otherwise nefariously obtained, and so the system is capable of further classification of a user as a generic user at step 231 based on meeting minimal security protocol (e.g., code input in this example). Again, the request can be logged at step 229, and all logged access requests, the results, any identifications, the protocol(s) used and the applications to which the requests were provided can be sent to an identification data store 233, which can be used for future verification, to provide identification references to the identification details process, and which can track access requests for given users based on given applications. An identity management process 235, also executing on the cloud 206, can manage identity selection, as well as assist in classification of what identifications are suitable for which applications, in the absence of another source of this information.

Figure 3A:
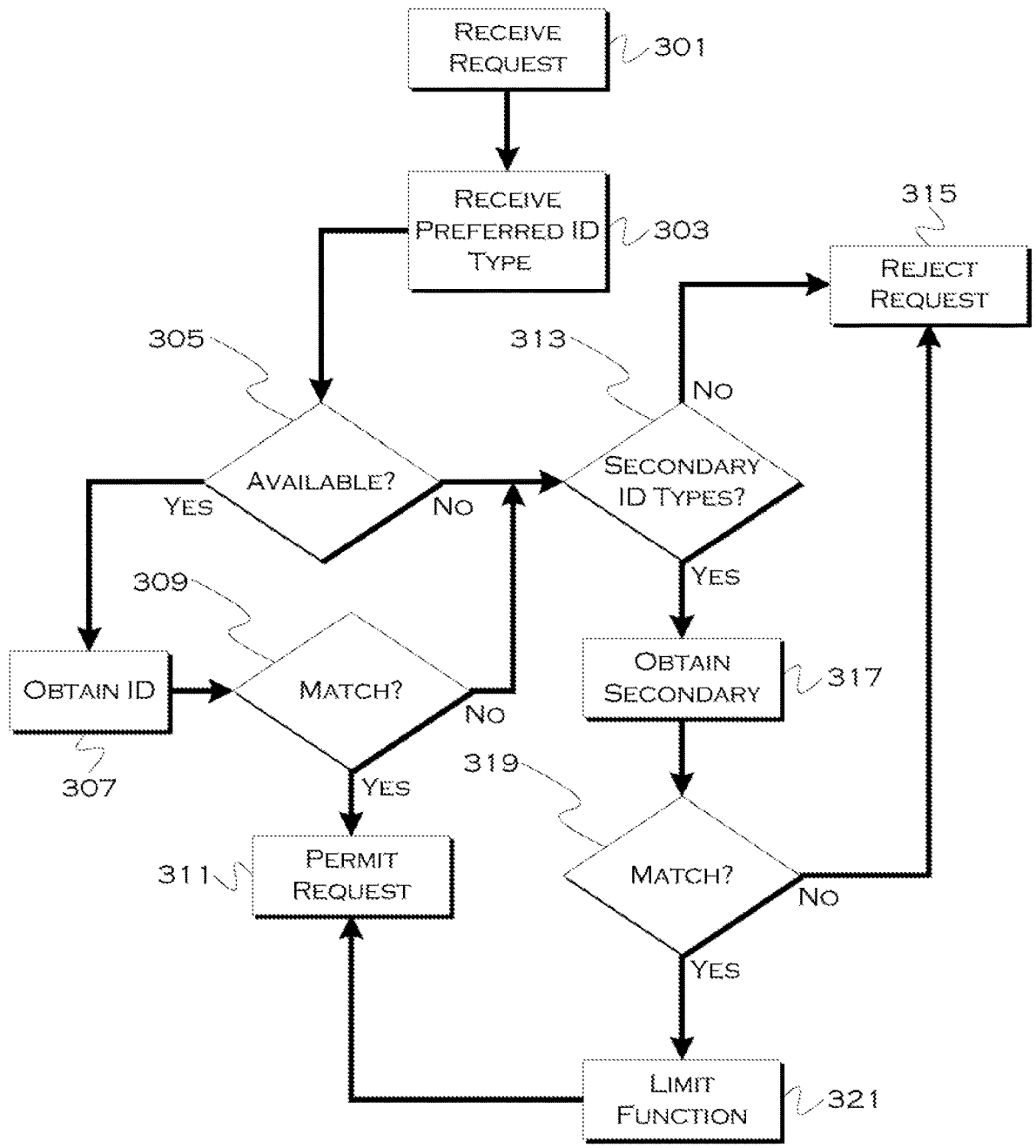
FIG. 3A shows an illustrative example of a process for utilizing various authentication options in response to a request for authentication.

FIG. 3A shows an illustrative example of a process for utilizing various authentication options in response to a request for authentication, executable by a vehicle 31 processor 3. In this example, the vehicle 31 receives a request for authentication at step 301. This request may include, for example, a designation of preferred identification (e.g., fingerprint) at step 303. Other specifications may include, for example, preferred user-type correlation (e.g., unique user, master user) and the requesting process may leave it up to the vehicle to determine if a particular available authentication system was usable to provide the requested correlation. For example, if the application requests that a unique user be identified, the vehicle 31 will verify the request when authentication parameters usable to define a unique user are detected.

In still a further example, the request may simply define a security level (e.g., high) and leave it up to the vehicle 31 to determine if any available access provision was usable to obtain a highly secure (from the perspective of the vehicle manufacturer) authentication. If such a primary authentication system is available (primary in the sense that the single system or specified group of systems meets requirements associated with the application security designation) at step 305, the vehicle 31 utilizes the primary authentication system to obtain a user identification at step 307. This can include both a specific, unique identification and/or a tier of authorization. If the identification matches an expected identification at step 309, the vehicle 31 may grant the access request (this credential matching can also occur on a requesting application receiving the identification) or send authentication verification back to a requesting application.

In some instances, for example, the requesting entity may require one or more secondary identifications, based on results returned from primary identification. For example, if a requesting application specified security that the vehicle 31 either: a) uniquely identified the user or b) identified the user as a master user, the latter may require device ID (as a master device) and a code input. If the device that was identified by the device ID was, in fact, a master device based on vehicle 31 designation, it may not be a master device that the requesting application had previously seen. Thus, even though the vehicle 31 authenticated the user as being a master user because of the master device presence (from the vehicle 31 perspective) and the code input, the application may require one-time further authentication since it had not yet seen and confirmed this master device ID. In such an instance, further secondary identification from available options could be utilized at step 313.

In a similar manner, if the primary authentication method(s) is/are not available at step 305, the vehicle 31 can consider secondary alternatives at step 313. If insufficient or unsuitable (based on application designation of what is or is not suitable, for example) secondary identification is available, the vehicle 31 may reject the access request at step 315. Otherwise, the vehicle 31 may obtain the secondary identification through the available secondary authentication systems, which individually may have been designated as providing lower security, but which in the aggregate may be determined to meet minimum security requirements. This determination of what constitutes an acceptable combination of lower security options can be defined by a manufacturer or by the requesting application, which could specify whether a combination of three lower security options was suitable, for example, or whether a combination of specific lower security options was suitable.

For example, a manufacturer may have an aggregation model specifying which secondary medium or low security systems aggregate to provide a high security authentication. This model may be accessible by vehicles 31. In other examples, the requesting application may designate a set of secondary authentication systems usable to fulfil the request (e.g., device ID and passcode or any two of device ID, passcode and local wireless network identification). In this latter example, wireless network identification is another usable factor that can passively authenticate a user as being, for example, within communication distance, if not connected to, a known wireless network known to be present for previous acceptable access requests (e.g., a network address is stored with respect to the application). This is yet another example of the types of authentication systems that can be provided by a vehicle 31 in response to an access request.

In this example, if the secondary access provisions were met (meaning the primary authentication method was unavailable), the vehicle 31 may also limit certain access at step 321. For example, with regards to a checking account application, a user might be able to check a balance, but unable to transfer money. This, again, could all be controlled via the particular application as well, and not be controlled by any onboard vehicle process, unless, for example, the access restriction was for the vehicle 31 or another onboard vehicle process (e.g., the checking account application resided on the vehicle and was usable for in-vehicle or vehicle-assisted purchases, which may then be restricted by the vehicle based on the lower level of security).

Figure 3B:
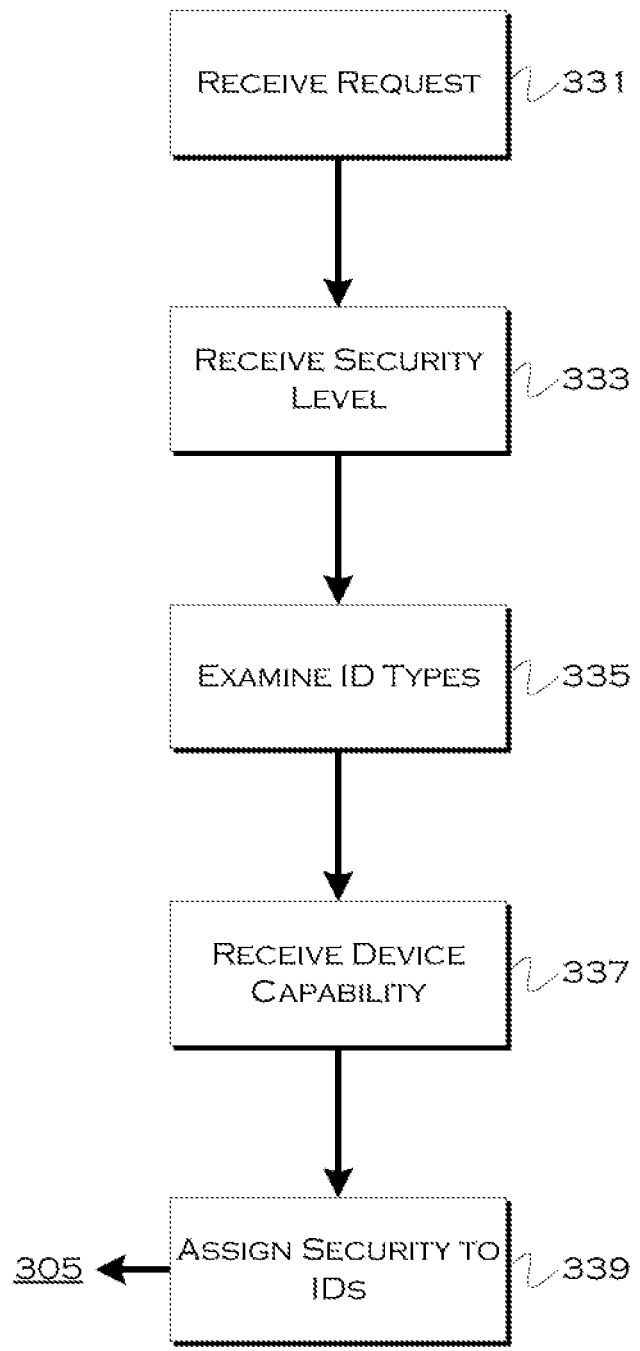
FIG. 3B shows an alternative version of authentication, wherein the vehicle has more control over what available authentication system provides suitable authentication.

FIG. 3B shows an alternative version of authentication, also executable by a vehicle 31 processor 3 wherein the vehicle 31 has more control over what available authentication system provides suitable authentication. In this example, the vehicle 31 receives an authentication request at step 331, as well as receiving a security designation at step 333. Here, the security designation may be one of a plurality of predefined tiers, for example, high, medium or low. Since the application providing the request may be incapable of evaluating available security authentication options, the vehicle 31 can examine which onboard options are available at step 335.

Also, in this example, the vehicle 31 may be able to leverage other connected devices (other than a requesting device), which may include options lacking in a vehicle 31 onboard. For example, a first phone may provide the authentication request, and mandate a high-security authentication. If the vehicle 31 lacks any unique or high-security identification capability, the vehicle 31 may be able to determine at step 337 that another connected phone may include a fingerprint scanner, usable by the vehicle 31 for authentication and predefined as corresponding to a suitable high security authentication. In this sense, the vehicle 31 can consolidate the authentication capability of multiple devices for purposes of serving an authentication request.

Based on which identification types are available, the vehicle 31 can then assign security levels to the various available authentication types at step 339, and proceed to step 305, treating the request as though it had requested the specific available authentication type (biometric) that now has been correlated to the request-specified security level (high security).

By using the illustrative embodiments, and the like, vehicles 31 can fulfil both onboard and connected system authentication requests by determining suitable authentication from a plurality of available options as recognized by the vehicle 31 and in accordance with security types pre-designated for those options as well as combinations of lower security options pre-designated as meeting a higher security requirement when used in concert. This allows application designers to specify security without necessarily having to know what options will be available at the time of a request. Since vehicles 31 vary wildly with regards to option packages, it otherwise might be difficult to design an application that would meet the requisite level of security with regards to all vehicles 31, unless a very minimal standard were included (one that all vehicles 31 were assured to have).

In addition to having exemplary processes executed by a vehicle computing system located in a vehicle 31, in certain embodiments, the exemplary processes may be executed by a computing system in communication with a vehicle computing system. Such a system may include, but is not limited to, a wireless device 53 (e.g., and without limitation, a mobile phone) or a remote computing system (e.g., and without limitation, a server on a remote network 61) connected through the wireless device 53 or a vehicle modem 63. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device 53, then it is likely that the wireless device 53 is not performing that portion of the process, since the wireless device would not send and receive information with itself. One of ordinary skill in the art will understand when it is inappropriate to apply a particular VACS to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive an authentication request, at a vehicle, from an application executing on a device in communication with the vehicle, including a security designation;
determine if the vehicle has access to a primary security authentication system corresponding to the security designation;
responsive to the vehicle having access, utilize the primary authentication system to authenticate a user via the determined primary security authentication system; and
provide user credentials, obtained based on successful use of the primary authentication system, to the device.

2. The system of claim 1, wherein the security designation includes a preferred method of authentication and wherein the determination if the vehicle has access to the primary security authentication system includes determining if the vehicle has access to a system providing the preferred method of authentication.

3. The system of claim 2, wherein the preferred method of authentication includes voice identification.

4. The system of claim 2, wherein the preferred method of authentication includes visual identification.

5. The system of claim 2, wherein the preferred method of authentication includes biometric identification.

6. The system of claim 1, wherein the security designation includes a preferred authentication level of correlation.

7. The system of claim 6, wherein the level of correlation includes a unique identification.

8. The system of claim 6, wherein the level of correlation includes a tiered level identification.

9. The system of claim 1, wherein the security designation includes a security level of a predefined set of security tiers.

10. The system of claim 1, wherein the user credentials uniquely identify the user.

11. The system of claim 1, wherein the user credentials identify the user as belonging to one of a plurality of predefined access tiers, without uniquely identifying the user.

12. The system of claim 1, wherein the processor is configured to determine a plurality of available secondary security authentication systems, individually predefined as providing a lower tier of authentication than an unavailable primary security authentication system, that are predefined as collectively representing a security level equal to the requested security designation, when successfully utilized to authenticate the user in conjunction with each other.

13. The system of claim 12, wherein the processor is configured to utilize the determined plurality of available secondary authentication systems, in place of the primary authentication system, to authenticate the user and provide user credentials, responsive to determining that the primary authentication system is unavailable.

14. A method comprising:
receiving an authentication request at a vehicle, including a security designation, from an application in communication with the vehicle;
determining a primary authentication system, accessible to the vehicle, meeting the security designation;
responsive to determining the primary authentication system, using the primary authentication system to authenticate a user; and
providing credentials to the application, responsive to successful authentication via the vehicle-accessible authentication system.

15. The method of claim 14, further comprising:
receiving identification of an authentication system provided by a device wirelessly connected to the vehicle computing system, different from a device on which the application is executing; and
including the identified authentication system in the determining.

16. The method of claim 14, wherein the security designation includes a type of authentication.

17. The method of claim 14, wherein the security designation includes a specified authentication correlation.

18. The method of claim 14, wherein the security designation includes security tier of a predefined plurality of security tiers.

19. The method of claim 18, further comprising determining a plurality of available authentication systems that, based on predefined security levels associated with individual ones of the plurality, aggregate to achieve the designated security tier base on a predefined aggregation model.

20. A method comprising:
responsive to a vehicle determining that the vehicle lacks access to a primary authentication system specified in an authentication request received from an application executing on a device in communication with a vehicle computer, determining a plurality of available secondary security authentication systems that are predefined as collectively representing a predefined security level corresponding to the security designation, when successfully utilized to authenticate the user in conjunction with each other, based on a predefined aggregation model defining a plurality of authentication system aggregation options and corresponding security levels for each aggregation; and
utilizing the predetermined plurality of available secondary authentication systems to fulfil the authentication request.

* * * * *